US00RE39041E

(19) United States
(12) Reissued Patent
Nojima et al.

(10) Patent Number: US RE39,041 E
(45) Date of Reissued Patent: Mar. 28, 2006

(54) AMMONIA DECOMPOSITION CATALYSTS

(75) Inventors: Shigeru Nojima, Hiroshima (JP); Rie Tokuyama, Hiroshima (JP); Kouzo Iida, Hiroshima (JP)

(73) Assignee: Mitsubishi Jukogyo Kabushiki Kaisha, Tokyo (JP)

(21) Appl. No.: 10/052,225

(22) Filed: Jan. 16, 2002

Related U.S. Patent Documents

Reissue of:
(64) Patent No.: 5,679,313
Issued: Oct. 21, 1997
Appl. No.: 08/472,057
Filed: Jun. 6, 1995

(30) Foreign Application Priority Data

Jun. 8, 1994 (JP) ..... 6-125991
Jun. 8, 1994 (JP) ..... 6-125992

(51) Int. Cl.
*C01B 3/04* (2006.01)

(52) U.S. Cl. ..... 423/237; 423/351; 423/658.2
(58) Field of Classification Search ..... 423/328.2, 423/237, 351, 658.2; 502/64, 66
See application file for complete search history.

(56) References Cited

U.S. PATENT DOCUMENTS 5,338,715 A * 8/1994 Iida et al. ..... 502/54

FOREIGN PATENT DOCUMENTS

| | | | | |
|---|---|---|---|---|
| DE | 40 20 914 | | 1/1992 | |
| DE | 4020914 | * | 1/1992 | ..... 423/237 |
| EP | 0 290 947 | | 11/1988 | |
| EP | 0 642 827 | | 3/1995 | |
| JP | 132465 | * | 11/1978 | ..... 423/237 |
| JP | 53-132465 | * | 11/1978 | ..... 423/237 |
| JP | 107265 | * | 4/1990 | |
| JP | 02107265 | * | 4/1990 | |

* cited by examiner

*Primary Examiner*—Wayne A. Langel
(74) *Attorney, Agent, or Firm*—Anderson Kill & Olick PC; Eugene Lieberstein; Michael N. Meller

(57) ABSTRACT

An ammonia decomposition catalyst wherein a first catalyst having a crystalline silicate which is represented by the formula in terms of molar ratio of oxides as dehydrated:

$$(1\pm0.8)R_2O.[aM_2O_3.bM'O.cAl_2O_3].ySiO_2,$$

wherein R denotes an alkaline metal ion and/or hydrogen ion, M denotes a VIII Group element, rare earth element, titanium, vanadium, chromium, niobium, antimony or gallium, M' denotes magnesium, calcium, strontium or barium, $a \geqq 0$, $20>b \geqq 0$, $a+c=1$, $3000>y>11$ or a specific porous material as a carrier and iridium or a noble metal as an active metal is present together with or covered with a second catalyst having at least one element selected from the group consisting of titanium, vanadium, tungsten and molybdenum, if necessary, as well as a method of using the same.

6 Claims, 1 Drawing Sheet

AMMONIA DECOMPOSITION CATALYSTS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a catalyst for decomposing ammonia contained in waste gases to nitrogen and a method of using the same for ammonia decomposition.

2. Description of the Related Art

Ammonia is widely used as a starting material for fertilizers and nitric acid as well as a reducing agent for removal of nitrogen oxides (NOx) in coolants and exhaust gases. As a result, a large amount of ammonia is emitted from various chemical plants, industrial waste disposal facilities for such things as refrigerators, and combustion exhaust gas treatment facilities.

Ammonia is a gas having a characteristic irritating odor, and should be emitted into the atmosphere as little as possible. In reality, however, the formation of ammonia by degradation of organisms, emission of ammonia from coolants in disposed machines, and emission of unreacted ammonia in the reduction process of nitrogen oxides in flue gases result in the release of large amounts of ammonia into the atmosphere.

As a method for preventing ammonia from being emitted into the atmosphere, the decomposition of ammonia into nitrogen, which is harmless, is known utilizing a catalyst of iron oxide or nickel oxide held on a carrier such as an alumina or silica-alumina carrier, by which the reaction is effected according to the reaction equation shown below.

$$2NH_3+3/2O_2 \rightarrow N_2+3H_2O$$

However, when using a conventional catalyst NO, $NO_2$ and $N_2O$ are generated as a result of the side reactions shown below and cause the another problem of air pollution.

$$2NH_3+5/2O_2 \rightarrow 2NO+3H_2O$$

$$2NH_3+7/2O_2 \rightarrow 2NO_2+3H_2O$$

$$2NH_3+O_2 \rightarrow N_2O+3H_2O$$

SUMMARY OF THE INVENTION

An object of the present invention is to provide an ammonia decomposition catalyst capable of decomposing and removing ammonia with a high efficiency without producing by-products nitrogen oxides which may cause air pollution, whereby solving the problems associated with the conventional method described above.

A first aspect of this invention provides an ammonia decomposition catalyst comprising: as a carrier a crystalline silicate which is represented by the following formula in terms of molar ratio in a dehydrated state:

$$(1\pm0.8)R_2O.[aM_2O_3.bAl_2O_3].eMeO.ySiO_2,$$

wherein R denotes an alkaline metal ion and/or hydrogen ion, M denotes at least one element selected from the group consisting of VIII group elements, rare earth elements, titanium, vanadium, chromium, niobium, antimony and gallium, Me denotes an alkaline earth metal, $a\geqq0$, $b\geqq0$, $c\geqq0$, $a+b=1$, $y/c>12$ and $y>12$, and which has a X-ray diffraction pattern shown in Table 1 hereinbelow; or as a carrier at least one porous material selected from the group consisting of $\gamma$-$Al_2O_3$, $\theta$-$Al_2O_3$, $ZrO_2$, $TiO_2$, $TiO_2.ZrO_2$, $SiO_2.Al_2O_3$, $Al_2O_3.TiO_2$, $SO_4/ZrO_2$, $SO_4/ZrO_2.TiO_2$, zeolites Y, zeolites X, zeolites A, mordenites, and silicalites; and iridium as an active metal.

Furthermore, the first aspect of the present invention also provides a method of decomposing ammonia using a catalyst described above as an ammonia decomposition catalyst wherein a gas containing ammonia is exposed to an ammonia decomposition catalyst whereby decomposing and removing the ammonia.

A second aspect of the present invention provides an ammonia decomposition catalyst which is a composite catalyst comprising: catalyst A which comprises as a carrier a crystalline silicate having a X-ray diffraction pattern shown in Table 1 hereinbelow and represented by the following formula in terms of molar ratio in a dehydrated state:

$$(1\pm0.8)R_2O.[aM_2O_3.bM'O.cAl_2O_3].SiO_2,$$

wherein R denotes an alkaline metal ion and/or hydrogen ion, M denotes a VIII group element, rare earth element, titanium, vanadium, chromium, niobium, antimony or gallium, M' denotes magnesium, calcium, strontium or barium, $a\geqq0$, $20>b\geqq0$, $a+c=1$, $3000>y>11$, or as a carrier at least one porous material selected from the group consisting of $\gamma$-$Al_2O_3$, $\theta$-$Al_2O_3$, $ZrO_2$, $TiO_2$, $TiO_2.ZrO_2$, $SiO_2.Al_2O_3$, $Al_2O_3.TiO_2$, $SO_4/ZrO_2$, $SO_4/ZrO_2.TiO_2$, zeolites Y, zeolites X, zeolites A, mordenites, and silicalites, and iridium as an active metal; and catalyst B comprising at least one element selected from the group consisting of titanium, vanadium, tungsten and molybdenum.

The second aspect of the present invention also provides that particles of catalysts A and B may also be carried as a mixture of powders on a honeycomb substrate.

In addition, a layered catalyst is provided in which particles of catalyst A are carried first on the honeycomb substrate and a layer of particles of catalyst B is disposed on the catalyst A layer.

A third aspect of the present invention provides an ammonia decomposition catalyst which is a layered catalyst wherein catalyst C comprising as a carrier a crystalline silicate which has a X-ray diffraction pattern shown in Table 1 hereinbelow and which is represented by the following formula in a dehydrated state in terms of molar ratio:

$$(1\pm0.8)R_2O.[aM_2O_3.bM'O.cAl_2O_3].ySiO_2,$$

wherein R denotes an alkaline metal ion and/or hydrogen ion, M denotes a VIII group element, rare earth element, titanium, vanadium, chromium, niobium, antimony or gallium, M' denotes magnesium, calcium, strontium or barium, $a\geqq0$, $20>b\geqq0$, $a+c=1$, $3000>y>11$, or as a carrier at least one porous material selected from the group consisting of $\gamma$-$Al_2O_3$, $\theta$-$Al_2O_3$, $ZrO_2$, $TiO_2$, $TiO_2.ZrO_2$, $SiO_2.Al_2O_3$, $Al_2O_3.TiO_2$, $SO_4/ZrO_2$, $SO_4/ZrO_2.TiO_2$, zeolites Y, zeolites X, zeolites A, mordenites and silicalites, and at least one noble metal selected from the group consisting of platinum, palladium, rhodium and ruthenium as an active metal is covered with catalyst B comprising at least one element selected from the group consisting of titanium, vanadium, tungsten, and molybdenum.

The catalyst of the first aspect, catalyst A of the second aspect, and catalyst C of the third aspect according to the present invention essentially have compositions similar to those developed by the present inventors as a catalyst for treatment of exhaust gases from internal combustion engines containing nitrogen oxides (NOx), carbon monoxide (CO) and hydrocarbon (HC) (Japanese Patent Provisional Publication 7-80315 and 6-296870). However, such catalysts have not been known to promote the decomposition of ammonia. The crystalline silicates in the catalyst of the first aspect, catalyst A of the second aspect, and catalyst C of the third aspect are characterized to have the crystalline structure showing the X-ray diffraction pattern shown below in Table 1.

TABLE 1

| Interstitial distance (value d) | Relative strength |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong
S: Strong
M: Middle
W: Weak
(X-ray source Cu)

The catalysts according to the present invention described as the first to third aspects are preferably made using a binder, such as alumina sol and silica sol, and a carrier such as cordierite, and is preferably converted into a honeycomb by a wash coat method or a solid method.

The catalysts according to the present invention exhibits stable ammonia decomposition performance without degradation even in the presence of $SO_2$ in exhaust gases. In addition, no disadvantageous production of acid ammonium sulfate is observed because of a low ability of oxidizing $SO_2$ to $SO_3$.

Furthermore, by exposing a gas containing ammonia to a catalyst of the first to third aspects of the present invention at a temperature of 100° to 600° C., ammonia in the gas is decomposed to nitrogen. This decomposition reaction proceeds selectively, and so hazardous gases such as NO, $NO_2$ and $N_2O$ are generated as by-products.

The crystalline silicate of the catalyst employed in the first aspect of the present invention can be synthesized by hydrothermal synthesis from compounds containing elements constituting such silicate. Alternatively, as such crystalline silicate, a layered composite crystalline silicate may also be employed in which using a crystalline silicate previously synthesized as a mother crystal a crystalline silicate consisting of Si and O having the crystalline structure identical to that of the mother crystal is grown on the surface of the mother crystal. In such layered composite crystalline silicate, $H_2O$ is prevented from penetrating into the crystalline silicate as a result of the hydrophobic effect of the crystalline silicate consisting of Si and O grown on the external surface (called silicalite). Accordingly, the release of a metal, such as aluminum, from the lattice of the crystalline silicate due to $H_2O$ is suppressed, whereby suppressing deterioration of the catalyst.

The metal iridium carried on the crystalline silicate in the catalyst of the first aspect and various porous carriers may be incorporated as metal ions by means of ion exchange or may be incorporated by impregnation wherein the carrier is impregnated with an aqueous solution of a metal salt, such as a chloride. Iridium to be carried can exhibit a satisfactory activity at a concentration of 0.002% by weight, and for a higher activity about 0.02% by weight is preferred.

Catalyst A of the second aspect of the present invention can be utilized as an ammonia decomposition catalyst as described above. When catalyst A is used in the presence of a standard denitration catalyst (catalyst B), formation of NOx as a by-product is further prevented, whereby promoting selective conversion from $NH_3$ to $N_2$. Thus, additional effect is provided in which NOx formed as a by-product by catalyst A is converted by catalyst B to $N_2$ in the reaction according to the equation shown below.

$$4NH_3+4NO+O_2 \rightarrow 4N_2+6H_2O$$

As a method for letting iridium carried as an active metal in catalyst A on various carriers, ion exchange for incorporating metal ions of iridium or impregnation for impregnating the carrier with an aqueous solution of iridium salt, such as iridium chloride, may be employed. Iridium to be carried can exhibit a satisfactory activity at a concentration of 0.002% by weight, and for a higher activity about 0.02% by weight is preferred.

A model showing catalyst A and catalyst B of the second aspect of the present invention carried on a honeycomb Substrate is illustrated in FIGS. 1 and 2. Both catalysts suppress the formation of by-product NOx.

In FIG. 1, catalysts A and B are carried as a mixture of powders, and NOx formed in a small amount by catalyst A is eliminated in the denitration reaction by catalyst B.

In FIG. 2, catalysts A and B are provided at layers, and NOx formed as a by-product by catalyst A in the lower layer is diffused and released, but subsequently eliminated by catalyst B in the upper layer by means of the denitration reaction with adsorbed $NH_3$.

The ratio of catalysts A and B, in terms of weight, may range widely from 1:99 to 99:1.

Catalyst C of the third aspect of the present invention is capable of decomposing ammonia at a low temperature but suffers from formation of by-product NOx. Accordingly, it may not exhibit the performance to meet the objective of the present invention in some cases. If so, by coating catalyst B, which is a standard denitration catalyst component, on the layer of catalyst C, the formation of NOx can be prevented and selective conversion from $NH_3$ to $N_2$ is promoted. Thus, NOx formed as a by-product is converted to $N_2$ as a result of the effect of catalyst B in the reaction according to the equation shown below.

$$4NH_3+4NO+O_2 \rightarrow 4N_2+6H_2O$$

As a method for carrying at least one noble metal selected from the group consisting of platinum, palladium, rhodium and ruthenium as an active metal on various carriers in catalyst C, an ion exchange method for incorporating such noble metal ions into the carrier material or an impregnation method in which the carrier is impregnated with an aqueous solution of a noble metal salt, such as a chloride, may be employed. The active metal (noble metal) to be carried can exhibit a satisfactory activity at a concentration of 0.002% by weight, and for a higher activity about 0.02% by weight is preferred.

A model showing catalyst C and B of the third aspect of the present invention carried on a honeycomb substrate is illustrated in FIG. 3. NOx formed as by-products by catalyst C in the lower layer in FIG. 3 is diffused and released, but subsequently eliminated by catalyst B in the upper layer by means of a denitration reaction with adsorbed $NH_3$.

The ratio of catalysts C and B, in terms of weight, may range widely from 1:99 to 99:1.

DETAILED DESCRIPTION OF THE PREFERRED EMBODIMENTS

Figure 1:
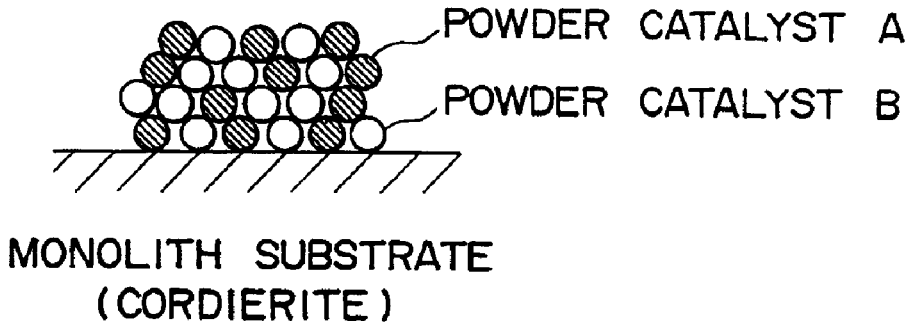
FIG. 1 shows a schematic view of carried catalyst particles in a honeycomb catalyst in one example according to the second aspect of the present invention.
Figure 2:
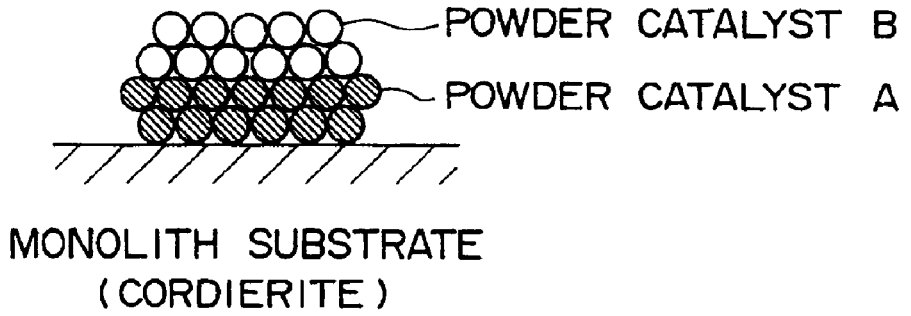
FIG. 2 shows a schematic view of carried catalyst particles in a honeycomb catalyst in another example according to the second aspect of the present invention.
Figure 3:
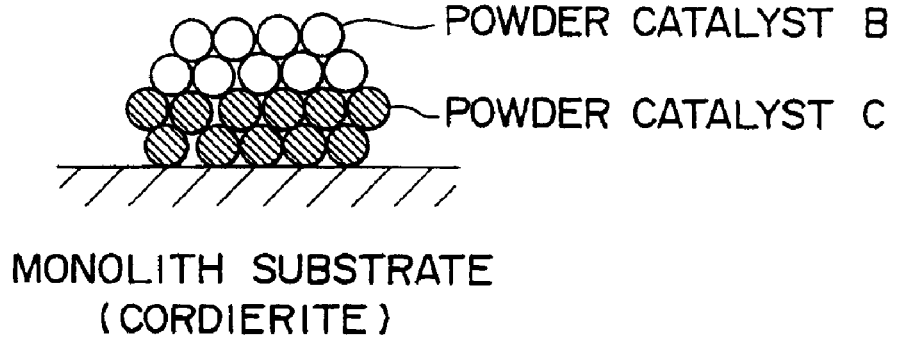
FIG. 3 shows a schematic view of carried catalyst particles in a honeycomb catalyst in an example according to the third aspect of the present invention.

The advantages of the catalysts according to the present invention are further detailed in the following examples.

Preparation of catalysts according to the first aspect of the invention

Preparation of catalyst 1

5616 g of water glass #1 (30% $SiO_2$) was dissolved in 5429 g of water to yield solution A. Separately, 718.9 g of aluminum sulfate, 110 g of ferric chloride, 47.2 g of calcium acetate, 262 g of sodium chloride and 2020 g of concentrated hydrochloric acid were dissolved together in 4175 g of water to yield solution B. Solution A and solution B were fed in a certain ratio to form a precipitate, and the mixture was stirred thoroughly to yield a slurry at pH 8.0. The slurry thus obtained was charged in a 20 L autoclave, to which 500 g of tetrapropyl ammonium bromide was added and the mixture was subjected to hydrothermal synthesis at 160° C. for 72 hours. After synthesis, washing with water, drying and sintering for 3 hours at 500° C., crystalline silicate 1 was obtained. Crystalline silicate 1 thus obtained is represented in terms of molar ratio of oxides (excluding crystal water) by the formula shown below and has the crystal structure by X-ray diffraction pattern shown in Table 1.

$$0.5Na_2O0.5H_2O.[0.8Al_2O_6.0.2Fe_2O_2.0.2Fe_2O_2.0.25CaO].25SiO_2$$

Crystalline silicate 1 obtained above was subjected to $NH_4$ ion exchange by stirring with 4N aqueous solution of $NH_4Cl$ at 40° C. for 3 hours. After the ion exchange, the silicate was washed and dried at 100° C. for 24 hours and sintered at 400° C. for 3 hours to obtain crystalline silicate 1 of type H.

Then, to 100 g of crystalline silicate 1 of type H, 3 g of alumina sol and 55 g of silica sol (20% $SiO_2$) as binders and 200 g of water were added, and the mixture was stirred thoroughly to yield a slurry for wash coat. Then a monolith substrate for cordierite (400-cell lattice) was immersed in the slurry obtained above, and taken out. After blowing excessive slurry off, the substrate was dried at 200° C. The coating ratio was 200 g per 1 L of the substrate. The substrate thus coated was designated as coated honeycomb 1.

Then coated honeycomb 1 was immersed in and impregnated with iridium chloride solution (2.88 g of $IrCl_4.H_2O$ in 200 cc of $H_2O$) for 1 hour, fluid deposited on the wall of the substrate was wiped off and the honeycomb was dried at 200° C. After purging with nitrogen for 12 hours at 500° C., honeycomb catalyst 1 was obtained.

Preparation of catalysts 2 to 15

Except for adding cobalt chloride, ruthenium chloride, rhodium chloride, lanthanum chloride, cerium chloride, titanium chloride, vanadium chloride, chromium chloride, antimony chloride, gallium chloride and niobium chloride in the molar amount as an oxide similar to that of $Fe_2O_3$ instead of ferric chloride used in the synthesis of crystalline silicate 1 in the preparation of honeycomb catalyst 1 described above, the procedure similar to that employed for crystalline silicate 1 was conducted to obtain crystalline silicates 2 to 12. The crystal structures of these crystalline silicates as X-ray diffraction patterns were shown above in Table 1, with the compositions being represented by the following formula in terms of molar ratio of oxides (dehydrated form):

$$(0.5\pm0.3)Na_2O.(0.5\pm0.3)H_2O.(0.2M_2O_3.0.8Al_2O_3.0.25CaO).25SiO_2$$

wherein M denotes Co, Ru, Rh, La, Ce, Ti, V, Cr, Sb, Ga or Nb.

Then, except for adding magnesium acetate, strontium acetate and barium acetate each in the molar amount as an oxide similar to that of CaO instead of calcium acetate used in the synthesis of crystalline silicate 1, the procedure similar to that employed for crystalline silicate 1 was conducted to obtain crystalline silicates 13 to 15. The crystal structures of these crystalline silicates as X-ray diffraction patterns were shown above in Table 1, with the compositions being represented by the following formula in molar ratios of the oxides (dehydrated form):

$$0.5Na_2O.0.5H_2O.(0.2Fe_2O_3.0.8Al_2O_3.0.25MeO).25SiO_2,$$

wherein Me denotes Mg, Sr or Ba.

Using crystalline silicates 2 to 15 and the procedure similar to that for honeycomb catalyst 1, crystalline silicates 2 to 15 of type H were obtained and used to coat cordierite monolith substrates in the process similar to that for honeycomb catalyst 1 to yield coated honeycombs 2 to 15. The honeycombs were then immersed in an aqueous solution of iridium chloride and processed similarly as for honeycomb catalyst 1 to yield honeycomb catalysts 2 to 15.

Physical states of honeycomb catalysts 1 to 15 obtained above are summarized below in Table 2.

TABLE 2

| Honeycomb catalyst No. | Amount of carried active metal (wt %) | Crystalline silicate (carrier) Number | Composition |
|---|---|---|---|
| 1 | Ir (0.6) | 1 | $0.5Na_2O.0.5H_2O(0.2Fe_2O_30.8Al_2O_20.25CaO).25SiO_2$ |
| 2 | Ir (0.6) | 2 | $0.5Na_2O.0.5H_2O(0.2Co_2O_30.8Al_2O_20.25CaO).25SiO_2$ |
| 3 | Ir (0.6) | 3 | $0.4Na_2O.0.5H_2O(0.2Ru_2O_30.8Al_2O_20.25CaO).25SiO_2$ |
| 4 | Ir (0.6) | 4 | $0.5Na_2O.0.4H_2O(0.2Rh_2O_30.8Al_2O_20.25CaO).25SiO_2$ |
| 5 | Ir (0.6) | 5 | $0.5Na_2O.0.5H_2O(0.2La_2O_30.8Al_2O_20.25CaO).25SiO_2$ |
| 6 | Ir (0.6) | 6 | $0.6Na_2O.0.4H_2O(0.2Ce_2O_30.8Al_2O_20.25CaO).25SiO_2$ |

TABLE 2-continued

| Honeycomb catalyst No. | Amount of carried active metal (wt %) | Crystalline silicate (carrier) Number | Composition |
|---|---|---|---|
| 7 | Ir (0.6) | 7 | $0.5Na_2O.0.6H_2O(0.2Ti_2O_3 0.8Al_2O_2 0.25CaO).25SiO_2$ |
| 8 | Ir (0.6) | 8 | $0.4Na_2O.0.6H_2O(0.2V_2O_3 0.8Al_2O_2 0.25CaO).25SiO_2$ |
| 9 | Ir (0.6) | 9 | $0.5Na_2O.0.6H_2O(0.2Cr_2O_3 0.8Al_2O_2 0.25CaO).25SiO_2$ |
| 10 | Ir (0.6) | 10 | $0.6Na_2O.0.4H_2O(0.2Sb_2O_3 0.8Al_2O_2 0.25CaO).25SiO_2$ |
| 11 | Ir (0.6) | 11 | $0.6Na_2O.0.5H_2O(0.2Ga_2O_3 0.8Al_2O_2 0.25CaO).25SiO_2$ |
| 12 | Ir (0.6) | 12 | $0.5Na_2O.0.5H_2O(0.2Nb_2O_3 0.8Al_2O_2 0.25CaO).25SiO_2$ |
| 13 | Ir (0.6) | 13 | $0.5Na_2O.0.5H_2O(0.2Fe_2O_3 0.8Al_2O_2 0.25MgO).25SiO_2$ |
| 14 | Ir (0.6) | 14 | $0.5Na_2O.0.5H_2O(0.2Fe_2O_3 0.8Al_2O_2 0.25SrO).25SiO_2$ |
| 15 | Ir (0.6) | 15 | $0.5Na_2O.0.5H_2O(0.2Fe_2O_3 0.8Al_2O_2 0.25BaO).25SiO_2$ |

Using $\gamma$-$Al_2O_3$, $\theta$-$Al_2O_3$, $ZrO_2$, $TiO_2$, $TiO_2.ZrO_2$, $SiO_2.Al_2O_3$, $Al_2O_3.TiO_2$, $SO_4/ZrO_2$, $SO_4/ZrO_2.TiO_2$, zerolites Y, zeolites X, zeolites Z, mordenites and silicalites instead of crystalline silicate used in honeycomb catalyst 1 described above and employing the procedure similar to that for catalyst 1 to carry iridium, honeycomb catalysts 16 to 29 were obtained. Catalysts 16 to 29 are listed below in Table 3.

TABLE 3

| Honeycomb catalyst No. | Amount of carried active metal (wt %) | Carrier |
|---|---|---|
| 16 | Ir (0.6) | $\gamma$-$Al_2O_3$ |
| 17 | Ir (0.6) | $\theta$-$Al_2O_3$ |
| 18 | Ir (0.6) | $ZrO_2$ |
| 19 | Ir (0.6) | $TiO_2$ |
| 20 | Ir (0.6) | $TiO_2.ZrO_2$ |
| 21 | Ir (0.6) | $SiO_2.Al_2O_3$ |
| 22 | Ir (0.6) | $Al_2O_3.TiO_2$ |
| 23 | Ir (0.6) | $SO_4/ZrO_2$ |
| 24 | Ir (0.6) | $SO_4/ZrO_2.TiO_2$ |
| 25 | Ir (0.6) | Zeolite type Y |
| 26 | Ir (0.6) | Zeolite type X |
| 27 | Ir (0.6) | Zeolite type A |
| 28 | Ir (0.6) | Mordenite |
| 29 | Ir (0.6) | Silicalite |

Experiment 1

Ammonia decomposition test was conducted using honeycomb catalysts 1 to 29. Honeycomb catalysts 1 to 29 consisting of 144 cells in the dimension of 15×15×60 mm were placed in a reaction tube, to which ammonia gas having the composition shown below was supplied at SV=16300$h^{-1}$ and at the flow rate of 5.54$Nm^3/m^2$ to examine ammonia decomposition performance at the reaction temperatures of 300° and 400° C. Gas composition:

$NH_3$: 20 ppm
$SO_2$: 20 ppm
$CO_2$: 7%
$H_2O$: 6%
$O_2$: 14.7%
$N_2$: to 100%

Performance was evaluated by determining the ammonia decomposition ratio at the initial state of the reaction, NOx (NO, $NO_2$, $N_2O$) production ratio, and $SO_2$ oxidation ratio.

The ammonia decomposition ratio and NOx production ratio were calculated according to the formulae shown below.

Ammonia decomposition ratio (%)
$=[(\text{Inlet } NH_3 - \text{Outlet } NH_3)/(\text{Inlet } NH_3)]\times 100$ NOx production ratio (%)=
$[(\text{Outlet } (N_2O\times 2+NO+NO_2))/(\text{Inlet } NH_3)]\times 100$ $SO_2$ oxidation ratio (%)=
$[(\text{Outlet } SO_3)/(\text{Inlet } SO_2)]\times 100$ The results are shown in Table 4.

TABLE 4

| Honeycomb catalyst | Ammonia decomposition % 300 (° C.) | Ammonia decomposition % 400 (° C.) | Nox (NO, $NO_2$, $N_2O$) production (%) 300 (° C.) | Nox (NO, $NO_2$, $N_2O$) production (%) 400 (° C.) | $SO_2$ oxidation (%) 300 (° C.) | $SO_2$ oxidation (%) 400 (° C.) |
|---|---|---|---|---|---|---|
| 1 | 99 | 100 | 2 | 1 | 0.5 | 1.5 |
| 2 | 99 | 100 | 1 | 1 | 0.5 | 1.5 |
| 3 | 99 | 99 | 0.5 | 0.5 | 0 | 2 |
| 4 | 99 | 100 | 1 | 1 | 0 | 2 |
| 5 | 98 | 110 | 1 | 0.5 | 0 | 1 |
| 6 | 98 | 99 | 1 | 1.5 | 0 | 1 |
| 7 | 99 | 100 | 1 | 1 | 0 | 2 |
| 8 | 99 | 100 | 1 | 0.5 | 0 | 1 |
| 9 | 98 | 99 | 2 | 1.5 | 0.5 | 2 |
| 10 | 98 | 99 | 1 | 1 | 0 | 2 |
| 11 | 97 | 100 | 1 | 1 | 0 | 1 |
| 12 | 98 | 99 | 0.5 | 1 | 0 | 3 |
| 13 | 99 | 99 | 1 | 0.5 | 0 | 2 |
| 14 | 98 | 100 | 1 | 1 | 0 | 3 |
| 15 | 97 | 99 | 0.5 | 1.5 | 0 | 2 |
| 16 | 99 | 100 | 0.5 | 1 | 0 | 1 |
| 17 | 97 | 100 | 1 | 1 | 0.5 | 2 |
| 18 | 98 | 100 | 1 | 0.5 | 0 | 2 |
| 19 | 98 | 99 | 1 | 0.5 | 0 | 2 |
| 20 | 99 | 99 | 1 | 2 | 0 | 3 |
| 21 | 97 | 100 | 1 | 2 | 0 | 1.5 |
| 22 | 97 | 99 | 2 | 0.5 | 0 | 2 |
| 23 | 98 | 99 | 1 | 1 | 0.5 | 2 |
| 24 | 97 | 100 | 1 | 2 | 0 | 3 |
| 25 | 98 | 100 | 2 | 1 | 0 | 4 |
| 26 | 97 | 99 | 2 | 2 | 0 | 2 |
| 27 | 98 | 99 | 1 | 2 | 0 | 2 |
| 28 | 98 | 100 | 1 | 1.5 | 0 | 2.5 |
| 29 | 98 | 99 | 1 | 3 | 0.5 | 2 |

Experiment 2

Using honeycomb catalysts 1 to 29, the gas was supplied for a long period in the condition similar as in Experiment 1 to conduct durability evaluation test. The results obtained indicated that after the gas supply for 1000 hours in the condition described above the ammonia decomposition ratio, NOx production ratio and $SO_2$ oxidation ratio equivalent to those shown in Table 4 were maintained, ensuring that the catalysts had excellent durability.

Preparation of catalysts belonging to catalyst A of the second aspect

Preparation of powder catalyst 1

100 g of crystalline silicate 16f type H described above was immersed in the aqueous solution of iridium chloride (1 g of IrCl in 100 cc of water), kneaded thoroughly, and then evaporated to dryness at 200° C. After purging with nitrogen for 12 hours at 500° C., powder catalyst 1 which is classified to catalyst A was obtained.

Preparation of powder catalysts 2 to 15

Crystalline silicate 2 to 15 of type H listed above were immersed in the aqueous solution of iridium chloride similarly as in the case of powder catalyst 1 to obtain powder catalysts 2 to 15.

Powder catalysts 1 to 15 thus obtained are summarized below in Table 5.

Preparation of powder catalysts 31 and 32

Similarly as in the preparation of powder catalyst 30 but using a catalyst to which ammonium paratungstate incorporated in powder catalyst 30 was not added, Ti-V denitration catalyst powder 31 was obtained. The composition of this catalyst was Ti:V=95:5 (elemental ratio).

Similarly as in the preparation of powder catalyst 30 but using ammonium paramolybate $\{(NH_4)_6.Mo_7O_{24}.4H_2O\}$ instead of ammonium paratungstate, Ti-Mo-V denitration catalyst powder 32 was obtained. The composition of this catalyst was Ti:Mo:V=91:5:4 (elemental ratio).

TABLE 5

| Powder catalyst No. | Amount of carried active metal (wt %) | Crystalline silicate (carried) Number | Composition |
|---|---|---|---|
| 1 | Ir (0.6) | 1 | $0.5Na_2O.0.5H_2O(0.2Fe_2O_3 0.8Al_2O_3.0.25CaO).25SiO_2$ |
| 2 | Ir (0.6) | 2 | $0.5Na_2O.0.5H_2O(0.2Co_2O_3 0.8Al_2O_3.0.25CaO).25SiO_2$ |
| 3 | Ir (0.6) | 3 | $0.5Na_2O.0.5H_2O(0.2Ru_2O_3 0.8Al_2O_3.0.25CaO).25SiO_2$ |
| 4 | Ir (0.6) | 4 | $0.5Na_2O.0.5H_2O(0.2Rh_2O_3 0.8Al_2O_3.0.25CaO).25SiO_2$ |
| 5 | Ir (0.6) | 5 | $0.5Na_2O.0.5H_2O(0.2La_2O_3 0.8Al_2O_3.0.25CaO).25SiO_2$ |
| 6 | Ir (0.6) | 6 | $0.5Na_2O.0.5H_2O(0.2Ce_2O_3 0.8Al_2O_3.0.25CaO).25SiO_2$ |
| 7 | Ir (0.6) | 7 | $0.5Na_2O.0.5H_2O(0.2Ti_2O_3 0.8Al_2O_3.0.25CaO).25SiO_2$ |
| 8 | Ir (0.6) | 8 | $0.5Na_2O.0.5H_2O(0.2V_2O_3 0.8Al_2O_3.0.25CaO).25SiO_2$ |
| 9 | Ir (0.6) | 9 | $0.5Na_2O.0.5H_2O(0.2Cr_2O_3 0.8Al_2O_3.0.25CaO).25SiO_2$ |
| 10 | Ir (0.6) | 10 | $0.5Na_2O.0.5H_2O(0.2Sb_2O_3 0.8Al_2O_3.0.25CaO).25SiO_2$ |
| 11 | Ir (0.6) | 11 | $0.5Na_2O.0.5H_2O(0.2Ga_2O_3 0.8Al_2O_3.0.25CaO).25SiO_2$ |
| 12 | Ir (0.6) | 12 | $0.5Na_2O.0.5H_2O(0.2Nb_2O_3 0.8Al_2O_3.0.25CaO).25SiO_2$ |
| 13 | Ir (0.6) | 13 | $0.5Na_2O.0.5H_2O(0.2Fe_2O_3 0.8Al_2O_3.0.25MgO).25SiO_2$ |
| 14 | Ir (0.6) | 14 | $0.5Na_2O.0.5H_2O(0.2Fe_2O_3 0.8Al_2O_3.0.25SrO).25SiO_2$ |
| 15 | Ir (0.6) | 15 | $0.5Na_2O.0.5H_2O(0.2Fe_2O_3 0.8Al_2O_3.0.25BaO).25SiO_2$ |

Preparation of powder catalysts 16 to 29

Using $\gamma$-$Al_2O_3$, $\theta$-$Al_2O_3$, $ZrO_2$, $TiO_2$, $TiO_2.ZrO_2$, $SiO_2.Al_2O_2$, $Al_2O_3.TiO_2$, $SO_4/ZrO_2$, $SO_4/ZrO_2.TiO_2$, zeolite type Y, zeolite type X, zeolite type A, mordenite and silicalite instead of crystalline silicate used in powder catalyst 1 described above and employing the procedure similar to that for powder catalyst 1 to carry iridium, powder catalysts 16 to 29 were obtained. Powder catalysts 16 to 29 thus obtained are summarized below in Table 6.

TABLE 6

| Honeycomb catalyst No. | Amount of carried active metal (wt %) | Carrier |
|---|---|---|
| 16 | Ir (0.6) | $\gamma$-$Al_2O_3$ |
| 17 | Ir (0.6) | $\theta$-$Al_2O_3$ |
| 18 | Ir (0.6) | $ZrO_2$ |
| 19 | Ir (0.6) | $TiO_2$ |
| 20 | Ir (0.6) | $TiO_2.ZrO_2$ |
| 21 | Ir (0.6) | $SiO_2.Al_2O_3$ |
| 22 | Ir (0.6) | $Al_2O_3.TiO_2$ |
| 23 | Ir (0.6) | $SO_4/ZrO_2$ |
| 24 | Ir (0.6) | $SO_4/ZrO_2.TiO_2$ |
| 25 | Ir (0.6) | Zeolite type Y |
| 26 | Ir (0.6) | Zeolite type X |
| 27 | Ir (0.6) | Zeolite type A |
| 28 | Ir (0.6) | Mordenite |
| 29 | Ir (0.6) | Silicalite |

Preparation of powder catalysts belonging to catalyst B of the second aspect

Preparation of powder catalyst 30

670 g of metatitanic acid slurry ($TiO_2$ consent: 30 wt %, $SO_4$ content: 8 wt %) was admixed with 36 g of ammonium paratungstate $\{(NH_4)_{10}H_{10}.W_{12}O_{66}.6H_2O\}$ and 13 g of ammonium metavanadate, and the mixture was heated at 200° C. while kneading to evaporate water off. After air sintering at 550° C. for 3 hours, denitration catalyst powder 30 of Ti-W-V was obtained. The composition of this catalyst was Ti:W:V=91:5:4 (elemental ratio).

Preparation of honeycomb catalysts of the second aspect (powder mixture type)

Each 50 g of powder catalysts 1 and 30 were weighed, 3 g of alumina sol and 55 g of silica sol (20% $SiO_2$) as binders and 200 g of water were added, and the mixture was stirred thoroughly to yield a slurry for wash coat. Then a monolith substrate for cordierite (400-cell lattice) was immersed in the slurry obtained above, and taken out. After blowing excessive slurry off, the substrate was dried at 200° C. The coating ratio was 20 g per 100 cc of the substrate, and the substrate thus coated was designated as honeycomb catalyst 30.

50 g each of powder catalysts 2 to 30 was weighed and processed similarly as for honeycomb catalyst 30 to obtain honeycomb catalysts 31 to 58.

50 g each of powder catalysts i, 31 and 32 was weighed and processed similarly as for honeycomb catalyst 30 to obtain honeycomb catalysts 59 to 60.

Mixtures of 5 g of powder catalyst 1 with 95 g of powder catalyst 30, 20 g of powder catalyst 1 with 80 g of powder catalyst 30, 80 g of powder catalyst 1 with 20 g of powder catalyst 30, and 95 g of powder catalyst 1 with 5 g of powder catalyst 30 were made and processed similarly as for honeycomb catalyst 30 to obtain honeycomb catalysts 61 to 64.

Preparation of honeycomb catalysts of the second aspect (layered type)

To 100 g of powder catalyst 1, 3 g of alumina sol and 55 g of silica sol (20% $SiO_2$) as binders and 200 g of water were added, and the mixture was stirred thoroughly to yield a slurry for wash coat. Then a monolith substrate for cordierite (400-cell lattice) was immersed in the slurry obtained above, and taken out. After blowing excessive slurry off, the substrate was dried at 200° C. The coating ratio was 10 g per 100 cc of the substrate. Using powder catalyst 30 instead of powder catalyst 1 described above, a slurry for wash coat was prepared. The monolith substrate coated with powder catalyst 1 was further coated with the slurry for wash coat at the coating ratio of 10 g per 100 cc of the substrate, and dried at 200° C. to obtain honeycomb catalyst 65.

Similarly as for honeycomb catalyst 65 described above, the monolith substrates were coated firstly with any of powder catalysts 2 to 29 and secondly with powder catalyst 30 to obtain layered catalysts, which were designated as honeycomb catalysts 66 to 93.

Comparative Example 1

The monolith substrate was coated with only one of powder catalysts 1 and 30 similarly as for honeycomb catalyst 30 to yield honeycomb catalysts 94 and 95.

Experimental Example 3

Honeycomb catalysts 30 to 95 were subjected to the ammonia decomposition test similarly as in Example 1. The results are shown in Tables 7 and 8.

Experimental Example 4

Using honeycomb catalysts 30 to 93, the gas was supplied for a long period in the condition similar as in Experimental 1 to conduct durability evaluation test. The results obtained indicated that after the gas supply for 1000 hours in the condition described above the ammonia decomposition ratio, NOx production ratio and $SO_2$ oxidation ratio equivalent to those shown in Tables 7 and 8 were maintained, ensuring that the catalysts had excellent durability.

TABLE 7

| Honeycomb | Powder | Powder | | Mixture | Ammonia decomposition (%) | | Nox (NO, $NO_2$, $N_2O$) production (%) | | $SO_2$ oxidation (%) | |
|---|---|---|---|---|---|---|---|---|---|---|
| catalyst | catalyst A | catalyst B | Mode of carrying | weight ratio | 300° C. | 400° C. | 300° C. | 400° C. | 400° C. | 400° C. |
| 30 | 1 | 30 | Powder mixture | 50:50 | 99 | 100 | 0 | 0 | 0.5 | 1.5 |
| 31 | 2 | 30 | Powder mixture | 50:50 | 99 | 100 | 0 | 0 | 0.5 | 1.5 |
| 32 | 3 | 30 | Powder mixture | 50:50 | 99 | 99 | 0.5 | 0.5 | 0 | 2 |
| 33 | 4 | 30 | Powder mixture | 50:50 | 99 | 99 | 1 | 1 | 0 | 1 |
| 34 | 5 | 30 | Powder mixture | 50:50 | 98 | 100 | 0 | 0.5 | 0 | 1 |
| 35 | 6 | 30 | Powder mixture | 50:50 | 98 | 99 | 1 | 0.5 | 0 | 1 |
| 36 | 7 | 30 | Powder mixture | 50:50 | 99 | 100 | 0 | 1 | 0 | 1.5 |
| 37 | 8 | 30 | Powder mixture | 50:50 | 99 | 100 | 0 | 0.5 | 0 | 1 |
| 38 | 9 | 30 | Powder mixture | 50:50 | 98 | 99 | 2 | 0 | 0.5 | 2 |
| 39 | 10 | 30 | Powder mixture | 50:50 | 98 | 99 | 1 | 1 | 0 | 2 |
| 40 | 11 | 30 | Powder mixture | 50:50 | 97 | 100 | 1 | 0.5 | 0 | 1 |
| 41 | 12 | 30 | Powder mixture | 50:50 | 98 | 99 | 0.5 | 0 | 0 | 2 |
| 42 | 13 | 30 | Powder mixture | 50:50 | 99 | 99 | 1 | 0.5 | 0 | 2 |
| 43 | 14 | 30 | Powder mixture | 50:50 | 98 | 100 | 0.5 | 0 | 0 | 2 |
| 44 | 15 | 30 | Powder mixture | 50:50 | 97 | 99 | 0.5 | 1.5 | 0 | 2 |
| 45 | 16 | 30 | Powder mixture | 50:50 | 99 | 100 | 0.5 | 0 | 0 | 1 |
| 46 | 17 | 30 | Powder mixture | 50:50 | 97 | 100 | 1 | 1 | 0.5 | 2 |
| 47 | 18 | 30 | Powder mixture | 50:50 | 98 | 100 | 1 | 0 | 0 | 1.5 |
| 48 | 19 | 30 | Powder mixture | 50:50 | 98 | 99 | 0.5 | 0.5 | 0 | 2 |
| 49 | 20 | 30 | Powder mixture | 50:50 | 99 | 99 | 1 | 1 | 0 | 2 |
| 50 | 21 | 30 | Powder mixture | 50:50 | 97 | 100 | 1 | 1 | 0 | 1.5 |
| 51 | 22 | 30 | Powder mixture | 50:50 | 97 | 99 | 1 | 0.5 | 0 | 2 |
| 52 | 23 | 30 | Powder mixture | 50:50 | 98 | 99 | 1 | 1 | 0.5 | 2 |
| 53 | 24 | 30 | Powder mixture | 50:50 | 97 | 100 | 0.5 | 1 | 0 | 1 |
| 54 | 25 | 30 | Powder mixture | 50:50 | 98 | 100 | 0.5 | 0.5 | 0 | 2 |
| 55 | 26 | 30 | Powder mixture | 50:50 | 97 | 99 | 1 | 1 | 0 | 2 |
| 56 | 27 | 30 | Powder mixture | 50:50 | 98 | 99 | 1 | 1 | 0 | 2 |
| 57 | 28 | 30 | Powder mixture | 50:50 | 98 | 100 | 1 | 1 | 0 | 2 |
| 58 | 29 | 30 | Powder mixture | 50:50 | 98 | 99 | 0 | 1 | 0.5 | 2 |
| 59 | 1 | 31 | Powder mixture | 50:50 | 98 | 98 | 0 | 1 | 1 | 0.5 |
| 60 | 1 | 32 | Powder mixture | 50:50 | 99 | 99 | 0 | 0 | 0.5 | 1 |
| 61 | 1 | 30 | Powder mixture | 5:95 | 98 | 98 | 0 | 1 | 0.5 | 0.5 |
| 62 | 1 | 30 | Powder mixture | 20:80 | 97 | 98 | 0 | 1 | 0 | 2 |
| 63 | 1 | 30 | Powder mixture | 80:20 | 96 | 99 | 0 | 1 | 0 | 2 |
| 64 | 1 | 30 | Powder mixture | 95:5 | 97 | 98 | 0 | 1 | 0.5 | 2 |

TABLE 8

| Honeycomb | Powder | Powder | | Mixture | Ammonia decomposition (%) | | Nox (NO, $NO_2$, $N_2O$) production (%) | | $SO_2$ oxidation (%) | |
|---|---|---|---|---|---|---|---|---|---|---|
| catalyst | catalyst A | catalyst B | Mode of carrying | weight ratio | 300° C. | 400° C. | 300° C. | 400° C. | 400° C. | 400° C. |
| 65 | 1 | 30 | Upper layer B<br>Lower layer A | 50/50 | 99 | 100 | 0.5 | 1 | 0.5 | 1.5 |
| 66 | 2 | 30 | Upper layer B<br>Lower layer A | 50/50 | 99 | 100 | 1 | 0.5 | 0.5 | 1.5 |
| 67 | 3 | 30 | Upper layer B<br>Lower layer A | 50/50 | 99 | 99 | 0.5 | 0.5 | 0 | 1 |
| 68 | 4 | 30 | Upper layer B<br>Lower layer A | 50/50 | 99 | 99 | 0.5 | 1 | 0 | 2 |
| 69 | 5 | 30 | Upper layer B<br>Lower layer A | 50/50 | 98 | 100 | 0.5 | 0.5 | 0 | 1 |
| 70 | 6 | 30 | Upper layer B<br>Lower layer A | 50/50 | 98 | 99 | 1 | 1.5 | 0 | 1 |
| 71 | 7 | 30 | Upper layer B<br>Lower layer A | 50/50 | 99 | 100 | 1 | 0.5 | 0 | 2 |

TABLE 8-continued

| Honeycomb catalyst | Powder catalyst A | Powder catalyst B | Mode of carrying | Mixture weight ratio | Ammonia decomposition (%) 300° C. | Ammonia decomposition (%) 400° C. | Nox (NO, $NO_2$, $N_2O$) production (%) 300° C. | Nox (NO, $NO_2$, $N_2O$) production (%) 400° C. | $SO_2$ oxidation (%) 400° C. | $SO_2$ oxidation (%) 400° C. |
|---|---|---|---|---|---|---|---|---|---|---|
| 72 | 8 | 30 | Upper layer B<br>Lower layer A | 50/50 | 99 | 100 | 1 | 0.5 | 0 | 1 |
| 73 | 9 | 30 | Upper layer B<br>Lower layer A | 50/50 | 98 | 99 | 2 | 1.5 | 0.5 | 2 |
| 74 | 10 | 30 | Upper layer B<br>Lower layer A | 50/50 | 98 | 99 | 1 | 0.5 | 0 | 2 |
| 75 | 11 | 30 | Upper layer B<br>Lower layer A | 50/50 | 97 | 100 | 1 | 0.5 | 0 | 1 |
| 76 | 12 | 30 | Upper layer B<br>Lower layer A | 50/50 | 98 | 99 | 0.5 | 0.5 | 0 | 2 |
| 77 | 13 | 30 | Upper layer B<br>Lower layer A | 50/50 | 99 | 99 | 1 | 0.5 | 0 | 2 |
| 78 | 14 | 30 | Upper layer B<br>Lower layer A | 50/50 | 98 | 100 | 1 | 1 | 0 | 2 |
| 79 | 15 | 30 | Upper layer B<br>Lower layer A | 50/50 | 97 | 99 | 0.5 | 1.5 | 0 | 2 |
| 80 | 16 | 30 | Upper layer B<br>Lower layer A | 50/50 | 99 | 100 | 0.5 | 1 | 0 | 1 |
| 81 | 17 | 30 | Upper layer B<br>Lower layer C | 50/50 | 97 | 100 | 1 | 1 | 0.5 | 2 |
| 82 | 18 | 30 | Upper layer B<br>Lower layer C | 50/50 | 98 | 100 | 0.5 | 0.5 | 0 | 2 |
| 83 | 19 | 30 | Upper layer B<br>Lower layer C | 50/50 | 98 | 99 | 1 | 0.5 | 0 | 2 |
| 84 | 20 | 30 | Upper layer B<br>Lower layer C | 50/50 | 99 | 99 | 1 | 0.5 | 0 | 2 |
| 85 | 21 | 30 | Upper layer B<br>Lower layer C | 50/50 | 97 | 100 | 0.5 | 0.5 | 0 | 1.5 |
| 86 | 22 | 30 | Upper layer B<br>Lower layer C | 50/50 | 99 | 99 | 2 | 0.5 | 0 | 2 |
| 87 | 23 | 30 | Upper layer B<br>Lower layer C | 50/50 | 98 | 99 | 1 | 1 | 0.5 | 2 |
| 88 | 24 | 30 | Upper layer B<br>Lower layer C | 50/50 | 97 | 100 | 1 | 0.5 | 0 | 2 |
| 89 | 25 | 30 | Upper layer B<br>Lower layer C | 50/50 | 98 | 100 | 1 | 1 | 0 | 3 |
| 90 | 26 | 30 | Upper layer B<br>Lower layer C | 50/50 | 97 | 99 | 0.5 | 0.5 | 0 | 2 |
| 91 | 27 | 30 | Upper layer B<br>Lower layer C | 50/50 | 98 | 99 | 0.5 | 0.5 | 0 | 2 |
| 92 | 28 | 30 | Upper layer B<br>Lower layer C | 50/50 | 98 | 100 | 0.5 | 0.5 | 0 | 2 |
| 93 | 29 | 30 | Upper layer B<br>Lower layer C | 50/50 | 98 | 99 | 1 | 0.5 | 0.5 | 2 |
| 94 | 1 | — | — | — | 98 | 99 | 2 | 1 | 0.5 | 1.5 |
| 95 | — | 30 | — | — | 10 | 20 | 0 | 0 | 0 | 0 |

Preparation of catalysts belonging to catalyst C of the third aspect

Preparation of powder catalyst 33

100 g of crystalline silicate 1 of type H described above was immersed in the aqueous solution of chloroplatinate (0.15 g $H_2PtCl_6.6H_2O$ in 100 cc water), kneaded thoroughly, and evaporated to dryness at 200° C. After purging with nitrogen for 12 hours at 500° C., powder catalyst 33 was obtained.

Preparation of powder catalysts 34 to 37

Silicates 2 to 15 of type H described above were immersed in the aqueous solution of chloroplatinate similarly as for powder catalyst 33 to obtain powder catalysts 2 to 47. Physical state of powder catalysts 33 to 47 thus obtained are summarized below in Table 9.

TABLE 9

| Powder catalyst No. | Amount of carried active metal (wt %) | Crystalline silicate (carrier) Number | Crystalline silicate (carrier) Composition |
|---|---|---|---|
| 33 | Pt (0.06) | 1 | $0.5Na_2O.0.5H_2O(0.2Fe_2O_3 0.8Al_2O_3.0.25CaO).25SiO_2$ |
| 34 | Pt (0.06) | 2 | $0.5Na_2O.0.5H_2O(0.2Co_2O_3 0.8Al_2O_3.0.25CaO).25SiO_2$ |
| 35 | Pt (0.06) | 3 | $0.5Na_2O.0.5H_2O(0.2Ru_2O_3 0.8Al_2O_3.0.25CaO).25SiO_2$ |
| 36 | Pt (0.06) | 4 | $0.5Na_2O.0.5H_2O(0.2Rh_2O_3 0.8Al_2O_3.0.25CaO).25SiO_2$ |
| 37 | Pt (0.06) | 5 | $0.5Na_2O.0.5H_2O(0.2La_2O_3 0.8Al_2O_3.0.25CaO).25SiO_2$ |

TABLE 9-continued

| Powder catalyst No. | Amount of carried active metal (wt %) | Crystalline silicate (carrier) Number | Composition |
|---|---|---|---|
| 38 | Pt (0.06) | 6 | $0.5Na_2O.0.5H_2O(0.2Ce_2O_3 0.8Al_2O_3.0.25CaO).25SiO_2$ |
| 39 | Pt (0.06) | 7 | $0.5Na_2O.0.5H_2O(0.2Ti_2O_3 0.8Al_2O_3.0.25CaO).25SiO_2$ |
| 40 | Pt (0.06) | 8 | $0.5Na_2O.0.5H_2O(0.2V_2O_3 0.8Al_2O_3.0.25CaO).25SiO_2$ |
| 41 | Pt (0.06) | 9 | $0.5Na_2O.0.5H_2O(0.2Cr_2O_3 0.8Al_2O_3.0.25CaO).25SiO_2$ |
| 42 | Pt (0.06) | 10 | $0.5Na_2O.0.5H_2O(0.2Sb_2O_3 0.8Al_2O_3.0.25CaO).25SiO_2$ |
| 43 | Pt (0.06) | 11 | $0.5Na_2O.0.5H_2O(0.2Ga_2O_3 0.8Al_2O_3.0.25CaO).25SiO_2$ |
| 44 | Pt (0.06) | 12 | $0.5Na_2O.0.5H_2O(0.2Nb_2O_3 0.8Al_2O_3.0.25CaO).25SiO_2$ |
| 45 | Pt (0.06) | 13 | $0.5Na_2O.0.5H_2O(0.2Fe_2O_3 0.8Al_2O_3.0.25MgO).25SiO_2$ |
| 46 | Pt (0.06) | 14 | $0.5Na_2O.0.5H_2O(0.2Fe_2O_3 0.8Al_2O_3.0.25SrO).25SiO_2$ |
| 47 | Pt (0.06) | 15 | $0.5Na_2O.0.5H_2O(0.2Fe_2O_3 0.8Al_2O_3.0.25BaO).25SiO_2$ |

Preparation of powder catalysts 48 to 61

Using $\gamma$-$Al_2O_3$, $\theta$-$Al_2O_3$, $ZrO_2$, $TiO_2$, $TiO_2.ZrO_2$, $SiO_2.Al_2O_3$, $Al_2O_3.TiO_2$, $SO_4/ZrO_2$, $SO_4/ZrO_2.TiO_2$, zeolite type Y, zeolite type X, zeolite type A, mordenite and silicalite instead of crystalline silicate used in powder catalyst 33 described above and carrying platinum by the procedure similar to that of powder catalyst 33, powder catalysts 48 to 61 were obtained. Powder catalysts 48 to 61 thus obtained are summarized below in Table 10.

Preparation of powder catalysts 62 to 64

By immersing in the aqueous solution of palladium nitrate (0.15 g of $Pd(NO_3)_2$ in 100 cc of water), the aqueous solution of rhodium chloride (0.15 g or $RhCl_3.3H_2O$ in 100 cc of water) and the aqueous solution of ruthenium chloride (0.15 g of $RuCl_3.5H_2O$ in 100 cc of water) instead of chloroplatinate used in the preparation of powder catalyst 33 described above followed by thorough kneading followed by evaporation to dryness at 200° C., catalysts 62 to 64 were obtained similarly as for powder catalyst 33. Compositions of the catalysts thus obtained are shown also in Table 10.

Using power catalyst 30 of the second aspect instead of powder catalyst 33 described above, a slurry for wash coat was prepared, and then it was used to form an overlayer at a coating ratio of 10 g per 100 cc of the substrate on the monolith substrate already coated with powder catalyst 33, and dried at 200° C. to obtain honeycomb catalyst 96.

Similarly as for honeycomb catalyst 96 described above, the monolith substrates were coated firstly with any of powder catalysts 34 to 64 and subsequently with powder catalyst 30 of the second aspect to obtain layered catalysts, which were designated as honeycomb catalysts 97 to 127.

Similarly as for honeycomb catalyst 96, the substrates were coated with any of powder catalysts 31 and 32 of the second aspect to form the upper layer instead of powder catalyst 30 to obtain honeycomb catalysts 128 and 129.

Similarly as in the preparation of honeycomb catalyst 96, per 100 cc of the substrate, layered coatings were provided using 1 g of powder catalyst 33 to form the lower layer and 19 g of powder catalyst 30 to form the upper layer, 4 g of powder catalyst 33 to form the lower layer and 16 g of

TABLE 10

| Powder catalyst No. | Amount of carried active metal (Wt %) | Carrier |
|---|---|---|
| 48 | Pt (0.06) | $\gamma$-$Al_2O_3$ |
| 49 | Pt (0.06) | $\theta$-$Al_2O_3$ |
| 50 | Pt (0.06) | $ZrO_2$ |
| 51 | Pt (0.06) | $TiO_2$ |
| 52 | Pt (0.06) | $TiO_2.ZrO_2$ |
| 53 | Pt (0.06) | $SiO_2.Al_2O_3$ |
| 54 | Pt (0.06) | $Al_2O_3$ $TiO_2$ |
| 55 | Pt (0.06) | $SO_4/ZrO_2$ |
| 56 | Pt (0.06) | $SO_4/ZrO_2.TiO_2$ |
| 57 | Pt (0.06) | Zeolite type Y |
| 58 | Pt (0.06) | Zeolite type X |
| 59 | Pt (0.06) | Zeolite type A |
| 60 | Pt (0.06) | Mordenite |
| 61 | Pt (0.06) | Silicalite |
| 62 | Pd (0.06) | $0.5Na_2O.0.5H_2O(0.2Fe_2O_3.0.8Al_2O_3 0.25CaO).25SiO_2$ |
| 63 | Rh (0.06) | $0.5Na_2O.0.5H_2O(0.2Fe_2O_3.0.8Al_2O_3 0.25CaO).25SiO_2$ |
| 63 | Ru (0.06) | $0.5Na_2O.0.5H_2O(0.2Fe_2O_3.0.8Al_2O_3 0.25CaO).25SiO_2$ |

Preparation of honeycomb catalysts of the third aspect (layered type)

To 100 g of powder catalyst 33, 3 g of alumina sol and 55 g of silica sol (20% $SiO_2$) as binders and 200 g of water were added, and the mixture was stirred thoroughly to yield a slurry for wash coat. Then a monolith substrate for cordierite (400-cell lattice) was immersed in the slurry obtained above, and taken out. After blowing excessive slurry off, the substrate was dried at 200° C. The coating ratio was 10 g per 100 cc of the substrate.

powder catalyst 30 to form the upper layer; 16 g of powder catalyst 33 to form the lower layer and 4 g of powder catalyst 30 to form the upper layer and 19 g of powder catalyst 33 to form the lower layer and 1 g of powder catalyst 30 to form the upper layer; to obtain honeycomb catalysts 130 to 133.

Comparative Example 2

The honeycomb substrate was coated only with any one of powder catalyst 33 and powder catalyst 30 each at the coating ratio of 20 g per 100 cc of substrate to obtain honeycomb catalysts 134 and 135, respectively.

Experimental Example 5

Honeycomb catalysts 96 to 135 were subjected to the ammonia decomposition test similarly as in Example 1. The results are shown in Table 11.

Experimental Example 6

Using honeycomb catalysts 96 to 133, the gas supplied for a long period in the condition similar as in Experiment 1 to conduct durability evaluation test. The results obtained indicated that after the gas supply for 1000 hours in the condition described above the ammonia decomposition ratio, NOx production ratio and $SO_2$ oxidation ratio equivalent to those shown in Table 11 were maintained, ensuring that the catalysts had excellent durability.

TABLE 11

| Honeycomb | Powder | Powder | | Mixture | Ammonia decomposition (%) | | Nox (NO, $NO_2$, $N_2O$) production (%) | | $SO_2$ oxidation (%) | |
|---|---|---|---|---|---|---|---|---|---|---|
| catalyst | catalyst A | catalyst B | Mode of carrying | weight ratio | 300° C. | 400° C. | 300° C. | 400° C. | 400° C. | 400° C. |
| 96 | 33 | 30 | Upper layer B<br>Lower layer C | 50/50 | 99 | 100 | 0.5 | 0 | 0.5 | 1.5 |
| 97 | 34 | 30 | Upper layer B<br>Lower layer C | 50/50 | 99 | 99 | 0 | 1.0 | 0.5 | 1.5 |
| 98 | 35 | 30 | Upper layer B<br>Lower layer C | 50/50 | 98 | 99 | 0.5 | 1.0 | 0 | 2 |
| 99 | 36 | 30 | Upper layer B<br>Lower layer C | 50/50 | 99 | 99 | 0.5 | 1 | 0 | 1 |
| 100 | 37 | 30 | Upper layer B<br>Lower layer C | 50/50 | 98 | 100 | 0 | 0.5 | 0 | 1 |
| 101 | 38 | 30 | Upper layer B<br>Lower layer C | 50/50 | 98 | 100 | 1 | 0.5 | 0 | 1 |
| 102 | 39 | 30 | Upper layer B<br>Lower layer C | 50/50 | 99 | 100 | 0 | 1 | 0 | 1.5 |
| 103 | 40 | 30 | Upper layer B<br>Lower layer C | 50/50 | 99 | 100 | 0 | 1 | 0 | 1 |
| 104 | 41 | 30 | Upper layer B<br>Lower layer C | 50/50 | 97 | 99 | 1 | 0 | 0.5 | 2 |
| 105 | 42 | 30 | Upper layer B<br>Lower layer C | 50/50 | 98 | 99 | 1 | 0.5 | 0 | 2 |
| 106 | 43 | 30 | Upper layer B<br>Lower layer C | 50/50 | 97 | 100 | 1 | 0.5 | 0 | 1 |
| 107 | 44 | 30 | Upper layer B<br>Lower layer C | 50/50 | 98 | 99 | 0.5 | 0.5 | 0 | 2 |
| 108 | 45 | 30 | Upper layer B<br>Lower layer C | 50/50 | 99 | 98 | 1 | 0.5 | 0 | 2 |
| 109 | 46 | 30 | Upper layer B<br>Lower layer C | 50/50 | 97 | 100 | 0.5 | 0 | 0 | 2 |
| 110 | 47 | 30 | Upper layer B<br>Lower layer C | 50/50 | 97 | 99 | 1 | 1.5 | 0 | 2 |
| 111 | 48 | 30 | Upper layer B<br>Lower layer C | 50/50 | 99 | 100 | 0.5 | 0 | 0 | 1 |
| 112 | 49 | 30 | Upper layer B<br>Lower layer C | 50/50 | 97 | 100 | 0.5 | 1.0 | 0.5 | 2 |
| 113 | 50 | 30 | Upper layer B<br>Lower layer C | 50/50 | 98 | 100 | 1 | 0.5 | 0 | 1.5 |
| 114 | 51 | 30 | Upper layer B<br>Lower layer C | 50/50 | 97 | 99 | 0.5 | 1 | 0 | 2 |
| 115 | 52 | 30 | Upper layer B<br>Lower layer C | 50/50 | 99 | 99 | 0.5 | 1 | 0 | 2 |
| 116 | 53 | 30 | Upper layer B<br>Lower layer C | 50/50 | 97 | 100 | 1 | 1 | 0 | 1.5 |
| 117 | 54 | 30 | Upper layer B<br>Lower layer C | 50/50 | 97 | 99 | 1 | 1 | 0 | 2 |
| 118 | 55 | 30 | Upper layer B<br>Lower layer C | 50/50 | 98 | 100 | 1 | 1 | 0.5 | 2 |
| 119 | 56 | 30 | Upper layer B<br>Lower layer C | 50/50 | 97 | 100 | 1 | 1 | 0 | 1 |
| 120 | 57 | 30 | Upper layer B<br>Lower layer C | 50/50 | 98 | 100 | 0.5 | 0.5 | 0 | 2 |
| 121 | 58 | 30 | Upper layer B<br>Lower layer C | 50/50 | 97 | 99 | 1 | 1.5 | 0 | 2 |
| 122 | 59 | 30 | Upper layer B<br>Lower layer C | 50/50 | 98 | 100 | 0.5 | 1 | 0 | 2 |
| 123 | 60 | 30 | Upper layer B<br>Lower layer C | 50/50 | 98 | 100 | 1 | 1 | 0 | 2 |
| 124 | 61 | 30 | Upper layer B<br>Lower layer C | 50/50 | 98 | 99 | 0 | 1 | 0.5 | 2 |
| 125 | 62 | 30 | Upper layer B<br>Lower layer C | 50/50 | 97 | 99 | 1 | 1 | 0.5 | 1 |
| 126 | 63 | 30 | Upper layer B<br>Lower layer C | 50/50 | 97 | 98 | 0 | 1 | 0.5 | 1 |
| 127 | 64 | 30 | Upper layer B<br>Lower layer C | 50/50 | 98 | 99 | 0 | 1 | 0 | 2 |

TABLE 11-continued

| Honeycomb catalyst | Powder catalyst A | Powder catalyst B | Mode of carrying | Mixture weight ratio | Ammonia decomposition (%) 300° C. | Ammonia decomposition (%) 400° C. | Nox (NO, $NO_2$, $N_2O$) production (%) 300° C. | Nox (NO, $NO_2$, $N_2O$) production (%) 400° C. | $SO_2$ oxidation (%) 400° C. | $SO_2$ oxidation (%) 400° C. |
|---|---|---|---|---|---|---|---|---|---|---|
| 128 | 33 | 31 | Upper layer B<br>Lower layer C | 50/50 | 97 | 98 | 1 | 1 | 0 | 2 |
| 129 | 33 | 32 | Upper layer B<br>Lower layer C | 50/50 | 98 | 99 | 1 | 1 | 0.5 | 1 |
| 130 | 33 | 30 | Upper layer B<br>Lower layer C | 5/95 | 98 | 99 | 0 | 1 | 1 | 0.5 |
| 131 | 33 | 30 | Upper layer B<br>Lower layer C | 20/80 | 79 | 79 | 0 | 0 | 0.5 | 1 |
| 132 | 33 | 30 | Upper layer B<br>Lower layer C | 80/20 | 98 | 99 | 0 | 1 | 0.5 | 0.5 |
| 133 | 33 | 30 | Upper layer B<br>Lower layer C | 95/5 | 97 | 99 | 0 | 1 | 0 | 2 |
| 134 | 33 | — | Upper layer B<br>Lower layer C | — | 98 | 99 | 10 | 20 | 2 | 2 |
| 135 | — | 30 | Upper layer B<br>Lower layer C | — | 10 | 20 | 0 | 0 | 0 | 0 |

What is claimed is:

1. A method of decomposing ammonia in a gas with an ammonia decomposition catalyst comprising a crystalline silicate carrier of the formula $$(1\pm0.8)R_2O.[aM_2O_3.bAl_2O_3].cMeO.ySiO_2,$$

wherein R denotes an alkaline metal ion and/or hydrogen ion, M denotes at least one element selected from the group consisting of VIII group elements, rare earth elements, titanium, vanadium, chromium, niobium, antimony or gallium, Me denotes an alkaline earth metal, wherein $a\geqq0$, $b\geqq0$, $c\geqq0$ $a+c=1$, $y/c>12$ and $y>12$, and iridium as an active metal, wherein the gas containing ammonia is exposed to said catalyst, thus decomposing and removing the ammonia.

2. A method of decomposing ammonia in a gas with a composition ammonia decomposition catalyst comprising a first catalyst comprising as a carrier a crystalline silicate which is represented by the formula in the molar ratio as dehydrated:

$$(1\pm0.8)R_2O.[aM_2O_3.bM'O.cAl_2O_3]$$

wherein R denotes an alkaline metal ion and/or hydrogen ion, M denotes at least one element selected from the group consisting of VIII group elements, rare earth elements, titanium, vanadium, chromium, niobium, antimony, and gallium M' denotes at least one element selected from the group consisting of magnesium, calcium, strontium, and barium, wherein $a\geqq0$, $20>b\geqq0$, $a+c=1$, and $3000>y>11$, and iridium as an active metal; and a second catalyst comprising at least one element selected from the group consisting of titanium, vanadium, tungsten, and molybdenum, wherein the gas containing ammonia is exposed to said decomposition catalyst, thus decomposing and removing the ammonia.

3. A method of decomposing ammonia according to claim 2, wherein the first catalyst comprises a crystalline silicate carrier which is represented by the formula, as dehydrated;

$$(1\pm0.8)R_2O.[aM_2O_3.bAl_2O_3.ySiO_2,$$

wherein R denotes an alkaline metal ion and/or hydrogen ion, M denotes at least one element selected from the group consisting of VIII group elements, $T_1O_2$ is a carrier for and titanium and vanadium is the second catalyst.

4. A method of decomposing ammonia in a gas with a layered ammonia decomposition catalyst comprising: a first catalyst comprising as a carrier a crystalline silicate which is represented by a following formula in terms of molar ratio as dehydrated:

$$(1\pm0.8)R_2).[aM_2O_3.bM'O.cAl_2O_3].ySiO_2,$$

wherein R denotes at least one element selected from the group consisting of magnesium, calcium, strontium, and barium, $a\geqq0$, $20>b\geqq0$, $a+c=1$, and $3000>y>11$, and as an active metal at least one noble metal selected from the group consisting of platinum, palladium, rhodium, and ruthenium; and a second catalyst comprising at least one element selected from the group consisting of titanium, vanadium, tungsten, and molybdenum; wherein the second catalyst forms an overlayer covering the first catalyst, wherein the gas containing ammonia is exposed to said decomposition catalyst, thus decomposing and removing the ammonia.

[5. A method of decomposing ammonia in a gas with an ammonia decomposition catalyst comprising a carrier of at least one porous material selected from the group consisting of $\gamma$-$Al_2O_3$, $\theta$-$Al_2O_3$, $ZrO_2$, $TiO_2$, $TiO_2$, $ZrO_2$, $SiO_2.Al_2O_3$, $Al_2O_3.TiO_2$, $SO_4/ZrO_2$, $SO_4/ZrO_2.TiO_2$, zeolites Y, zeolites X, zeolites A, mordenites, and silicalites, and iridium as an active metal, wherein the gas containing ammonia is exposed to said catalyst, thus decomposing and removing the ammonia.]

6. A method of decomposing ammonia in a gas with a composite ammonia decomposition catalyst comprising a first catalyst comprising as a carrier at least one porous material selected from the group consisting of $\gamma$-$Al_2O_3$, $\theta$-$Al_2O_3$, $ZrO_2$, $TiO_2$, $TiO_2$, $ZrO_2$, $SiO_2.Al_2O_3$, $Al_2O_3.TiO_2$, $SO_4/ZrO_2$, $SO_4/ZrO_2.TiO_2$, zeolites X, zeolites A, mordenites, and iridium as an active metal; and a second catalyst comprising at least one element selected from the group consisting of titanium, vanadium, tungsten, and molybdenum, wherein the gas containing ammonia is exposed to said decomposition catalyst, thus decomposing and removing the ammonia.

7. A method of decomposing ammonia in a gas with a layered ammonia decomposition catalyst comprising: a first catalyst comprising as a carrier at least one porous material selected from the group consisting of $\gamma$-$Al_2O_3$, $\theta$-$Al_2O_3$, $ZrO_2$, $TiO_2$, $TiO_2$, $ZrO_2$, $SiO_2.Al_2O_3$, $Al_2O_3.TiO_2$, $SO_4/ZrO_2$, $SO_4/ZrO_2.TiO_2$, zeolites Y, zeolites X, zeolites A, mordenites, and silicalites, and as an active metal at least one noble metal selected from the group consisting of platinum, palladium, rhodium, and ruthenium,; and a second catalyst comprising at least one element selected from the group consisting of titanium, vanadium, tungsten, and molybdenum; wherein the second catalyst forms an overlayer covering the first catalyst, wherein the gas containing ammonia is exposed to said decomposition catalyst, thus decomposing and removing the ammonia.

* * * * *